United States Patent
Dyba et al.

(10) Patent No.: US 7,679,741 B2
(45) Date of Patent: Mar. 16, 2010

(54) METHOD AND MICROSCOPE FOR HIGH SPATIAL RESOLUTION EXAMINATION OF SAMPLES

(75) Inventors: Marcus Dyba, Mannheim (DE); Hilmar Gugel, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 405 days.

(21) Appl. No.: 11/653,446

(22) Filed: Jan. 16, 2007

(65) Prior Publication Data
US 2007/0206278 A1 Sep. 6, 2007

Related U.S. Application Data

(60) Provisional application No. 60/853,447, filed on Oct. 23, 2006.

(30) Foreign Application Priority Data
Mar. 1, 2006 (DE) .................. 10 2006 009 831

(51) Int. Cl.
*G01J 3/30* (2006.01)
(52) U.S. Cl. .................................... 356/318
(58) Field of Classification Search ............ 356/318
See application file for complete search history.

(56) References Cited

U.S. PATENT DOCUMENTS

| 4,621,911 | A * | 11/1986 | Lanni et al. ............. 359/386 |
| 6,055,097 | A * | 4/2000 | Lanni et al. ............. 359/386 |
| 6,255,642 | B1 * | 7/2001 | Cragg et al. ............. 250/216 |
| 7,064,824 | B2 * | 6/2006 | Hell ....................... 356/317 |
| 7,485,875 | B2 * | 2/2009 | Wolleschensky et al. . 250/458.1 |
| 2001/0045523 | A1 * | 11/2001 | Baer ..................... 250/459.1 |
| 2004/0114138 | A1 | 6/2004 | Hell |

(Continued)

FOREIGN PATENT DOCUMENTS

DE 101 18 355 B4 10/2002

(Continued)

OTHER PUBLICATIONS

U.S. Appl. No. 11/653,444, filed Jan. 16, 2007, Gugel et al.

(Continued)

*Primary Examiner*—Kara E Geisel
(74) *Attorney, Agent, or Firm*—Foley & Lardner LLP

(57) ABSTRACT

A method and a microscope, in particular a laser scanning fluorescence microscope, for high spatial resolution examination of samples, the sample (1) to be examined comprising a substance that can be repeatedly converted from a first state (Z1, A) into a second state (Z2, A), the first and the second states (Z1, A; Z2, B) differing from one another in at least one optical property, comprising the steps that the substance in a sample region (P) to be recorded is firstly brought into the first state (Z1, A), and that the second state (Z2, B) is induced by means of an optical signal (4), spatially delimited subregions being specifically excluded within the sample region (P) to be recorded, are defined in that the optical signal (4) is provided in the form of a focal line (10) with a cross-sectional profile having at least one intensity zero point (5) with laterally neighboring intensity maxima (9).

37 Claims, 5 Drawing Sheets

U.S. PATENT DOCUMENTS

| | | |
|---|---|---|
| 2004/0207854 A1 | 10/2004 | Hell et al. |
| 2006/0012869 A1 | 1/2006 | Wolleshensky |
| 2006/0012875 A1 | 1/2006 | Wolleshensky |
| 2007/0023686 A1* | 2/2007 | Wolleschensky et al. .. 250/458.1 |
| 2007/0206276 A1* | 9/2007 | Gugel et al. ................ 359/385 |
| 2007/0206277 A1* | 9/2007 | Gugel et al. ................ 359/385 |
| 2007/0268583 A1* | 11/2007 | Dyba et al. ................. 359/578 |

FOREIGN PATENT DOCUMENTS

| | | |
|---|---|---|
| DE | 101 54 699 A1 | 5/2003 |
| DE | 103 25 459 A1 | 11/2004 |
| DE | 103 25 460 A1 | 11/2004 |
| DE | 10 2004 034 962 A1 | 2/2006 |
| DE | 10 2004 034 996 A1 | 2/2006 |
| EP | 1 584 918 A2 | 12/2005 |

OTHER PUBLICATIONS

U.S. Appl. No. 11/623,703, filed Jan. 16, 2007, Gugel et al.

U.S. Appl. No. 11/623,690, filed Jan. 16, 2007, Dyba et al.

* cited by examiner

METHOD AND MICROSCOPE FOR HIGH SPATIAL RESOLUTION EXAMINATION OF SAMPLES

CROSS-REFERENCE TO RELATED PATENT APPLICATIONS

The right of foreign priority is claimed under 35 U.S.C. § 119(a) based on Federal Republic of Germany Application No. 10 2006 009 831.5, filed Mar. 1, 2006, the entire contents of which, including the specification, drawings, claims and abstract, are incorporated herein by reference. The present application also claims benefit of priority to U.S. Provisional Application Ser. No. 60/853,447, filed Oct. 23, 2006, the entire contents of which is incorporated herein by reference.

BACKGROUND OF THE INVENTION

The invention relates to a method and a microscope, in particular a laser scanning fluorescence microscope, for high spatial resolution examination of samples, the sample to be examined comprising a substance that can be repeatedly converted from a first state into a second state, the first and the second states differing from one another in at least one optical property, comprising the steps that the substance in a sample region to be recorded is firstly brought into the first state, and that the second state is induced by means of an optical signal, spatially delimited subregions being specifically excluded within the sample region to be recorded.

Methods and microscope of the type named at the beginning are known from practice. In principle, Abbe's law sets a theoretical limit to the spatial resolution of imaging optical methods owing to the diffraction limit, the diffraction limit being a function of the wavelength of the light used. However, it is possible with the aid of the method and microscopes discussed here to achieve spatial resolutions that are improved beyond the theoretical diffraction limit known from Abbe.

In the known methods, there are provided for this purpose in the samples to be examined substances that can be repeatedly converted from a first state into a second state, the first and the second states differing from one another in at least one optical property. In the case of most known methods, a first state is a fluorescence-capable state (named state A below), and the second state is a nonfluorescence-capable state (named state B below). After the substance in a sample region to be recorded has been brought into the fluorescence-capable state A by means of a switching signal, state B is induced in spatially limited subregions of the sample region to be recorded by means of an optical signal, and the fluorescence of fluorescence molecules is thereby suppressed. The physical process of fluorescence suppression can be of a very different nature in this case. Thus, for example, stimulated emission from the previously excited state, or an optically induced structural change in the fluorescence molecules is known.

What is decisive is that the transition induced by an optical signal from the first into the second state in the sample volume takes place in large regions in a saturated fashion, that is to say completely, and precisely does not take place in at least one subregion of the sample volume in that the optical switching signal is specifically not irradiated there. This effect can be achieved by producing an intensity zero point of the optical signal. No transition into the second state (in general the nonfluorescing state B) takes place at the zero point and in its immediate vicinity, and so the first state (in general the fluorescing state A) is retained. Even in the close vicinity of the intensity zero points, a saturation of the transition A→B owing to the optical signal leads in the illuminated regions of the sample region to be recorded to a (virtually) complete transfer into the state B. The more strongly the process is driven into saturation, that is to say the more energy that is introduced by the optical signal into the regions around the zero point, the smaller becomes the region with fluorescence molecules in the fluorescence-capable state A, or generally in an "luminous" state. This region can be rendered arbitrarily small in principle as a function of the degree of saturation in immediate zero point vicinity. It is therefore possible to mark regions of the state A that are arbitrarily much smaller than the smallest regions of an applied optical signal that are possible on the basis of the diffraction limit. If the region of the state A is subsequently read out, for example by radiating a test signal, the (fluorescence) measuring signal originates from a defined region that can be smaller than is permitted by the diffraction limit. If the sample is scanned point by point in the way described, an image is produced with a resolution that is better than is allowed by diffraction theory.

Methods of the type described here in the case of which the optical property of fluorescence capability/nonfluorescence capability is used as difference between two states are disclosed, for example, in DE 103 25 459 A1 and DE 103 25 460 A1. In these methods, fluorescence molecules are brought with the aid of an optical signal from a state A (fluorescence-capable) into a state B (nonfluorescence-capable), saturation being achieved in the transition A→B. The regions of the sample that remain in the fluorescence-capable state A result in each case from an intensity minimum, having a zero point, in the irradiated optical signal. The intensity minima are part of an interference pattern. The sample is scanned by displacing the intensity minima in the optical signal, the displacement being effected by shifting the phase of the interfering beams.

SUMMARY OF THE INVENTION

It is disadvantageous in the known methods that the interfering beams form an interference pattern with local punctiform intensity minima. Consequently, scanning the sample requires a point-to-point scanning operation in at least two dimensions, and this renders the scanning operation extremely time consuming.

It is now an object of the present invention to specify a method and a microscope of the type mentioned at the beginning which enable rapid scanning of a sample with structurally simple and cost effective means in conjunction with a compact design.

According to the invention, the above object is achieved. In accordance therewith, the method is configured and developed in such a way that the optical signal is provided in the form of a focal line with a cross-sectional profile having at least one intensity zero point with laterally neighboring intensity maxima.

The above object is achieved, furthermore, by a microscope. In accordance therewith, the microscope is configured and developed in such a way that the optical signal can be provided in the form of a focal line with a cross-sectional profile having at least one intensity zero point with laterally neighboring intensity maxima.

It was firstly realized in the way according to the invention that the imaging rates of known high resolution imaging methods is not sufficient for diverse applications for example in the field of real time microscopy of biological samples. It was then realized in a further inventive way that a line scan which is substantially quicker in comparison with a point scan is possible when the second state can be induced along a line that is narrow (arbitrarily, in principle). According to the invention to this end the optical signal is provided in the form of a focal line, the focal line exhibiting a cross-sectional profile having at least one intensity zero point—for conserving the first state along a line that is narrow (arbitrarily, in principle)—with laterally neighboring intensity maxima—for inducing the second state in saturation.

The method according to the invention and the microscope according to the invention can be used in a particularly advantageous way in conjunction with first and second states that are very long lasting or are even temporally stable permanently. In this case, it is possible to select for the saturation of the transition from the first into the second state a comparatively long period within which the energy of the optical signal that is required for saturation is irradiated. The local intensities relating to transitional saturation can thereby be selected to be very slight. Above all, the total energy available from a radiation source of the optical signal can be distributed over voluminous regions in the sample space, and a number of intensity zero points, or an extended zero point can be produced. The saturation can be achieved despite the low local intensities resulting therefrom in the vicinity of the zero point (s) by comparison with the application of the total signal around only one punctiform zero point. This requires that the signal be irradiated only for a sufficiently long time until all the molecules in the surroundings of the zero points are finally in the second state. This is a decisive difference from the case of a shortlived state (for example in the STED method with a typical lifetime of ~1 ns for a fluorescence-capable state A), where the energy required for saturation must be irradiated in such a short time (substantially faster than the rate A→B) that the total power of the radiation source is sufficient only to produce one (or at most a few) local zero points. It may be demonstrated for concrete systems that it is possible in the case of stable states (for example photochromic dyes) or long lived states (for example transfer into the triplet system in the case of the GSD, GSD=Ground State Depletion, method) for the power of cost effective and commercial laser systems to be distributed over such large regions that a number of punctiform intensity zero points (>>10) or entire stripes of vanishing intensity, in the immediate vicinity of which saturation can be achieved as before, can be produced in the sample. This enables a parallelized imaging when the sample is simultaneously scanned with the multiplicity of punctiform zero points or with zero point lines, and the signals are detected simultaneously for each zero point in a separate fashion by a detector. In this way, it is possible to design microscopes with resolutions below the classic diffraction limit, their imaging rate being in the region of STED-based methods, and being substantially increased by comparison with systems with a single local zero point.

It is provided in a concrete embodiment that the focal line is generated by integrating in the microscope an optical component which firstly produces an illumination line in the pupil plane conjugate with the pupil of the microscope objective. Furthermore, a phase modulating element is provided with which a phase modulation suitable for producing the cross-sectional profile of the focal line is carried out along the pupil line.

It can be provided in the course of the phase modulation that one or more phase jumps are introduced along the pupil line. It is particularly preferred to introduce a phase jump at the pupil midpoint. This phase jump is selected in a further advantageous way such that it corresponds to the length of half a wave train so that half of the line is retarded by half a wave train. There is thus produced in the focal plane a focal line with a cross-sectional profile that is composed of an intensity zero point with laterally neighboring intensity maxima. Alternatively, it is possible that a number of phase jumps by in each case half a wave train are introduced along the pupil line, such that as a result half of the total line, that is to say half of the light quantity that is radiated by the pupil, is likewise retarded by half a wave train by comparison with the other half.

With regard to a structurally simple design, it can be provided that the phase modulation along the pupil line is implemented by means of a spatial liquid-based phase modulator in an intermediate image of the pupil. Alternatively, it is possible to conceive the inclusion of an optical component with a phase retarding optical coating. It is possible in principle to use all phase retarding elements, such as substrates with dielectric coatings, phase modulators based on liquid crystals, or achromatic phase filters. The optics with the phase retarding property is ideally arranged in or near the pupil plane.

With regard to a structurally simple design, it can be provided that the pupil line is produced by focusing an illuminating light beam of an illuminating light source with a cylindrical lens or a Powell lens. Alternatively, the pupil line can be produced by imaging a slit diaphragm into the pupil plane. It is also conceivable to use holographic elements.

In a particularly advantageous way, the pupil line is coupled into the beam path by means of an Achrogate filter. It would then be possible in a preferred way to implement the phase modulation along the pupil line by means of additionally phase retarding layers on the filter, for example in the form of dielectric coatings.

With regard to a particularly compact design, the optical component for producing the pupil line, and the phase modulating element could be arranged as a structural unit in the illuminating beam path. With regard to a high degree of flexibility, the optical component for producing the pupil line, and the phase modulating element could also, however, be arranged as separate units at different positions in the illuminating beam path.

In order to ensure a coherent linear illumination of the pupil of the microscope objective, the illuminating light source for generating the optical signal is preferably designed as a laser light source.

In a particularly advantageous way, the light of the optical signal is polarized perpendicular to the pupil line in order in this way to exclude depolarization effects to a maximum extent.

In a particularly preferred embodiment, the focal line is produced sequentially in different spatial directions. Spatial directions oriented in an orthogonal fashion to one another can be involved in this case, for example. It can correspondingly be provided that the entire sample volume to be recorded is scanned sequentially in each of the spatial directions. Subsequently, the recorded individual images can be assembled mathematically to form an overall image, the result being to realize an increase in resolution in more than one direction.

It can be provided that the transition from the first state into the second state is implemented by means of multiphoton absorption. Alternatively, or in addition, the measuring signal emanating from the sample is read out by means of multiphoton excitation. Such a configuration is suggested, in particular, in the case of special applications, for example when the aim is to prevent a bleaching of the sample.

It is provided in a further preferred design that the optical signal and a test signal are respectively generated in order to read out the first state by means of pulsed light sources. A synchronization of the pulsed light sources proves to be advantageous in this case.

The illuminating light source for generating the optical signal can be combined with at least one further light source, in which case the further light source could serve for reading out the measuring signal emanating from the sample, and/or for generating a switching signal in order to induce the first state. In particular, the further light source could illuminate the sample entirely or partially, a linear illumination being preferred.

In addition, the focal line of the optical switching signal could be spatially superposed by a further line. In a particularly advantageous way, the spatial superposition is selected in such a way that the intensity zero point of the focal line of the optical signal is spatially superposed by the maximum of a line in order to read out the measuring signal emanating from the sample. Depending on the application, it is possible in this case for each line to be assigned a dedicated scanning device, preferably in the form of a scanning mirror, or for the lines to be scanned jointly with a single scanning device.

In order to exploit the speed advantages fully during imaging, the scanning direction is ideally tuned to the respective running direction of the pupil line. In a further advantageous way, a row detector can be used to carry out a line detection of the measuring signal emanating from the sample. The row detector can, for example, be designed as a CCD row. The use of an EMCCD or an APD (Avalanche Photodiode) is likewise conceivable.

With regard to an increase in the resolution along the optical axis, as well, the detector row is preferably arranged confocally with the focal line. In concrete terms, the detector row can in this case be arranged in the detection direction downstream of the scanning device (descanned detection) or upstream of the scanning device (nondescanned detection).

In a particularly advantageous way, the described microscope is used for the optically induced transition of dye molecules between various molecular states that differ from one another in at least one optical property. Thus, for example, the microscope can be used, for example, to induce a transition between the states of a trans-Cis isomerization or for switching photochromic dyes. Again, another possibility is use for transferring dye molecules in their triplet state during a GSD (Ground State Depletion) method. Finally, carrying out STED methods is suggested.

There are various possibilities of configuring and developing the teaching of the present invention in an advantageous way. To this end, reference is to be made, on the one hand, to the subordinate claims, and, on the other hand, to the subsequent explanation of preferred exemplary embodiments of the method according to the invention and the microscope according to the invention for high spatial resolution examination of samples.

BRIEF DESCRIPTION OF THE DRAWINGS

Preferred refinements and developments of the teaching are also explained in general in conjunction with explanations of the preferred exemplary embodiments and with the aid of the drawing, in which.

DETAILED DESCRIPTION OF THE PREFERRED EMBODIMENTS

Figure 1:
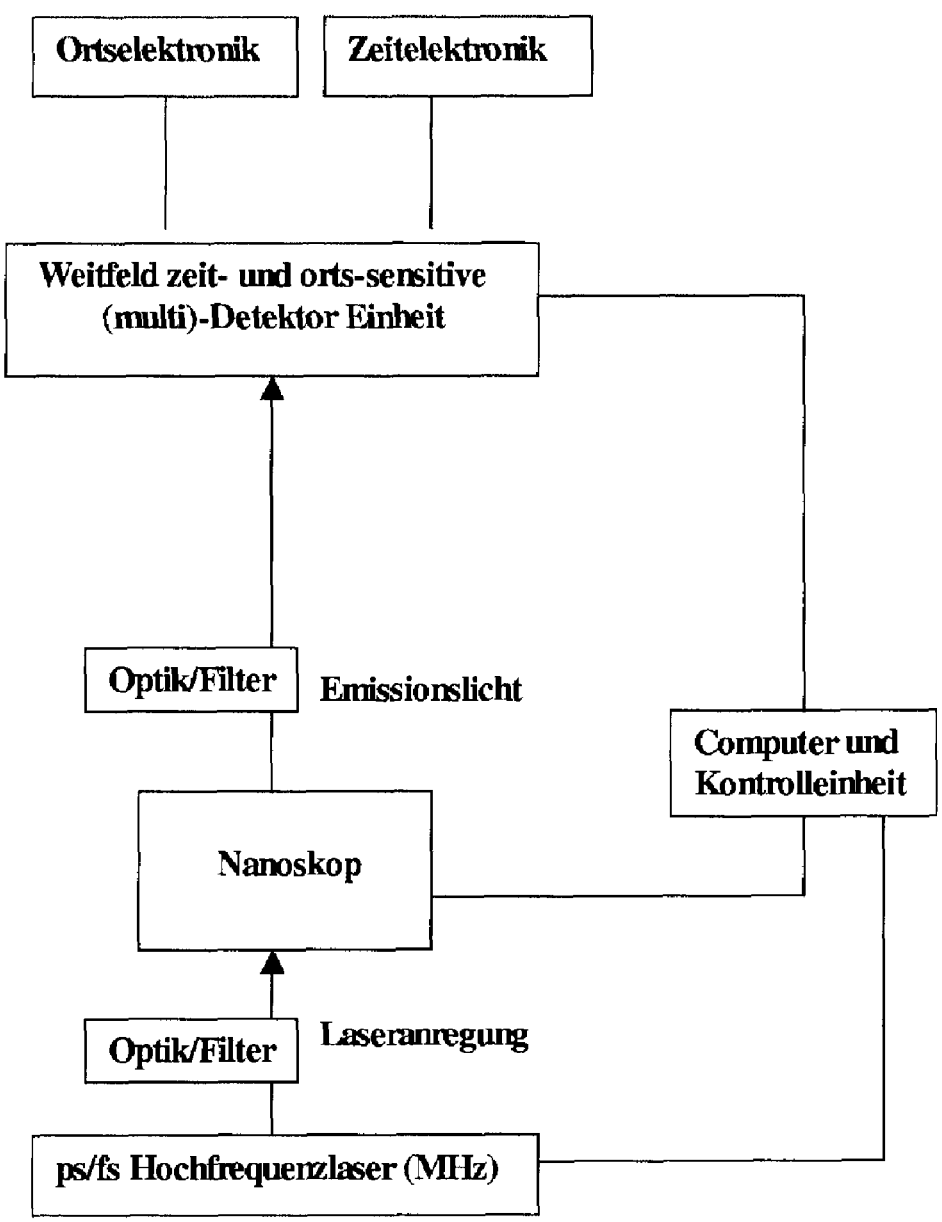
FIG. 1 shows a schematic of a cyclic illumination scheme of a method for high spatial resolution examination of samples.

FIG. 1 shows a schematic of a cyclic illumination operation such as is used for high spatial resolution examination of samples beyond the diffraction limited resolving limit. In accordance with FIG. 1a, the first step is to use a switching signal 2 to bring into the first state Z1 in the entire sample space P to be recorded a substance that is provided in the sample 1 and can be converted repeatedly from a first state Z1 into a second state Z2, the first and the second states Z1, Z2 differing from one another in at least one optical property. In the exemplary embodiment illustrated in concrete terms, the first state Z1 is a fluorescing state A, and the second state Z2 is a nonfluorescing state B. In the example illustrated in concrete terms, the substance provided in the sample 1 is a photochromic substance whose molecules are brought into the fluorescence-capable state A by irradiation with light of a first wavelength, the switching signal 2. This happens ideally by illumination through an objective 3 with a simple illumination line of the switching signal 2 in the sample space P, as is known when viewed per se from the prior art. Alternatively, the sample 1 can also be irradiated in the entire sample space P.

In the case of ground state depletion (GSD), the transition into the fluorescence-capable (singlet) state usually takes place spontaneously. The irradiation of optical switching signals is therefore superfluous in this case, there being a need only to take account of waiting times of typically 1 to 100 μs (in part also a little longer).

In a next step—illustrated in FIG. 1b—light of another wavelength, the so-called optical signal 4, is applied to the sample region P to be recorded. This happens in the form of a double line 9 with defined intensity zero points 5. The optical signal 4 induces in a saturated fashion the transition A→B in all regions 6 illuminated with the light of the optical signal 4. In other words, it is only a region of the substance that is narrowly defined in the immediate vicinity of the intensity zero point 5 that remains in state A. This remaining region of the substance in state A can be much smaller than diffraction limited structures. The size of the remaining region in state A is determined entirely as a function of the quality of the intensity minimum 5, and thus of the degree of saturation of the transition A→B that is achieved.

In FIG. 1c is a schematic of the readout operation of state A. To this end, an optical test signal 7 is irradiated into the sample region P to be recorded in such a way that the region prepared in accordance with FIG. 1b and in which the substance has remained in state A, is recorded. The test signal 7 is preferably likewise radiated linearly. In this case, a single line with a maximum is produced, the maximum being spatially superposed with the intensity zero point 5 of the optical signal 4. Consequently, the detection can also preferably be performed linearly, for example by a confocally arranged row detector, for example, in the form of a CCD row.

The cycle illustrated in FIGS. 1a to c is repeated, the line pattern being shifted somewhat further upon each repetition.

It is possible in this way for the entire sample region P to be recorded to be imaged with a resolution in the subdiffraction region.

Figure 2:
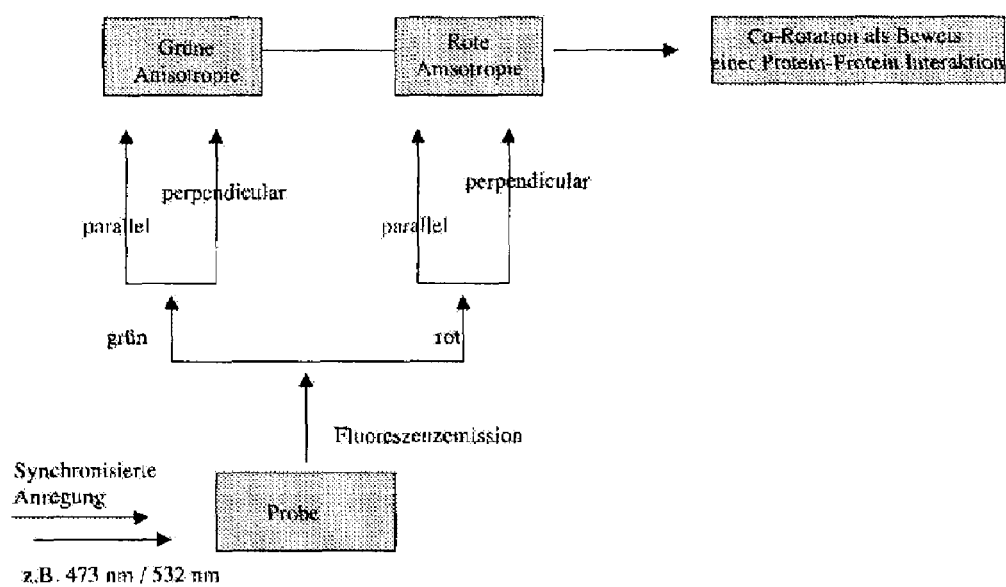
FIG. 2 shows a schematic of the production of a focal line with a cross-sectional profile having a single intensity maximum.

FIG. 2 shows a schematic of the production of an individual line structure of the illuminating light for reading out the states A, that is to say a single line with a maximum that—as set forth above—can be superposed with the intensity zero point 5 of the inventive focal line 10 of the optical signal 4. In accordance with FIG. 2a, the illuminating light is firstly imaged linearly through a suitable optics 11 in a plane FE' conjugate with the focal plane FE. An imaging lens 12 is used to focus the illumination line coherently in the pupil plane PE of an objective 13 with the aid of which the illuminating light is focused in the sample 1. The illumination line runs in the x-direction in the example illustrated. Consequently—as shown in FIG. 2b—the pupil PE is illuminated linearly in the y-direction in a centrally symmetrical fashion (pupil line 14). As shown in FIG. 2c—there is likewise produced in the focal plane FE of the objective 13 a linear light structure that is perpendicular to the pupil line 14 in the x-direction (focal line 15), and constitutes an image of the line in the plane FE' conjugate with the focal plane FE. The cross section of the focal line 15 has a diffraction limited extent when the pupil line 14 covers the entire pupil diameter. The cross-sectional extent of the focal line 15 is approximately 1.4 times greater (in a fashion limited by diffraction) than that of a diffraction limited point source (Airy disk).

The optics 11 indicated purely schematically in FIG. 2 can be implemented in various forms. Thus, a linear illumination of FE' or of the pupil PE can be achieved, for example, by imaging a slit diaphragm or by focusing an expanded illuminating light beam by means of a cylindrical lens or a Powell lens. The use of a Powell lens offers the advantage that the linear light structure produced has a particularly homogeneous light distribution. A further variant is the illumination via a beam splitter that reflects only in a linear fashion and is arranged in a plane of the microscope conjugate with the pupil plane PE. In principle, only the coherent linear illumination of the pupil PE in the y-direction (FIG. 2b) is decisive for generating a linear illumination of the sample 1 in the x-direction (FIG. 2c).

Figure 3:
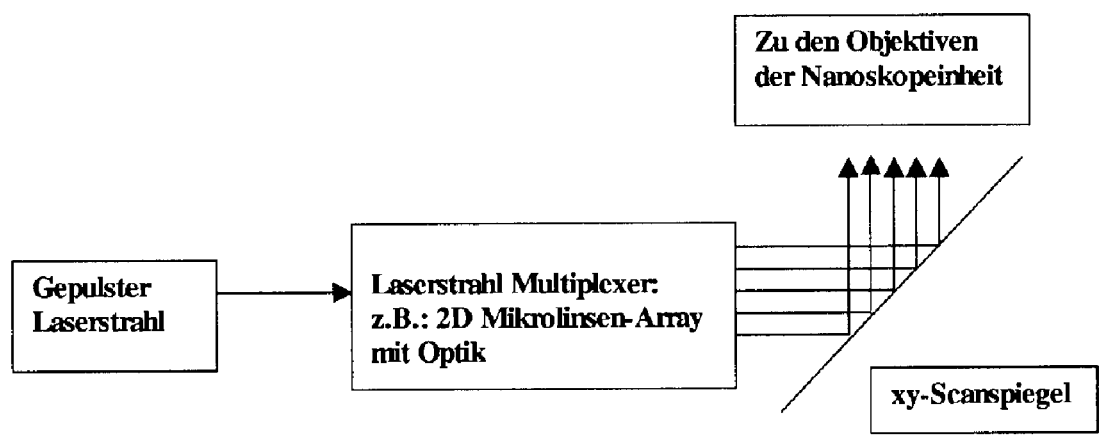
FIG. 3 shows a schematic of the inventive production of a focal line with a cross-sectional profile having at least one intensity zero point with laterally neighboring intensity maxima.

FIG. 3 is a schematic of an exemplary embodiment for the production of an inventive focal line 10 for the central zero point 5 in the cross section and laterally limiting maxima 9. A phase modulation of the optical signal 4 is implemented to this end along the pupil line 14. The linear illumination of the pupil PE is illustrated in FIG. 3a. A phase jump of half a wavelength is introduced at the pupil midpoint along the pupil line 14 such that one half of the line 14 is retarded by half a wave train by comparison with the other half of the line 14. This is indicated in FIG. 3a by the differently hatched regions. The consequence of this phase modulation is that a double line 9 with a central intensity zero point 5 is produced in the focal plane FE, as is illustrated in FIG. 3b. It is also possible in principle for other phase modulations to lead to structures with such a central minimum. Thus, each centrally symmetrical phase modulation having the property that 50% of the pupil line 14 is retarded by half a wave train produces a focal line 10 that is aligned in an orthogonal fashion to the pupil line 14 and has a central minimum in the cross-sectional profile. However, the cross section of the focal line 10 becomes more complicated in this case and thus in general comprises more maxima and minima.

As indicated in FIG. 3a by the arrows illustrated, the light is polarized perpendicular to the pupil line 14, that is to say in the x-direction. As a consequence of this, only polarization vectors with a pure tangential component occur in the entrance pupil 14. When traversing subsequent optics, these are depolarized much more weakly in the z-direction, that is to say in the beam direction, than are, for example, polarization vectors having (with reference to the pupil) radial components.

Figure 4:
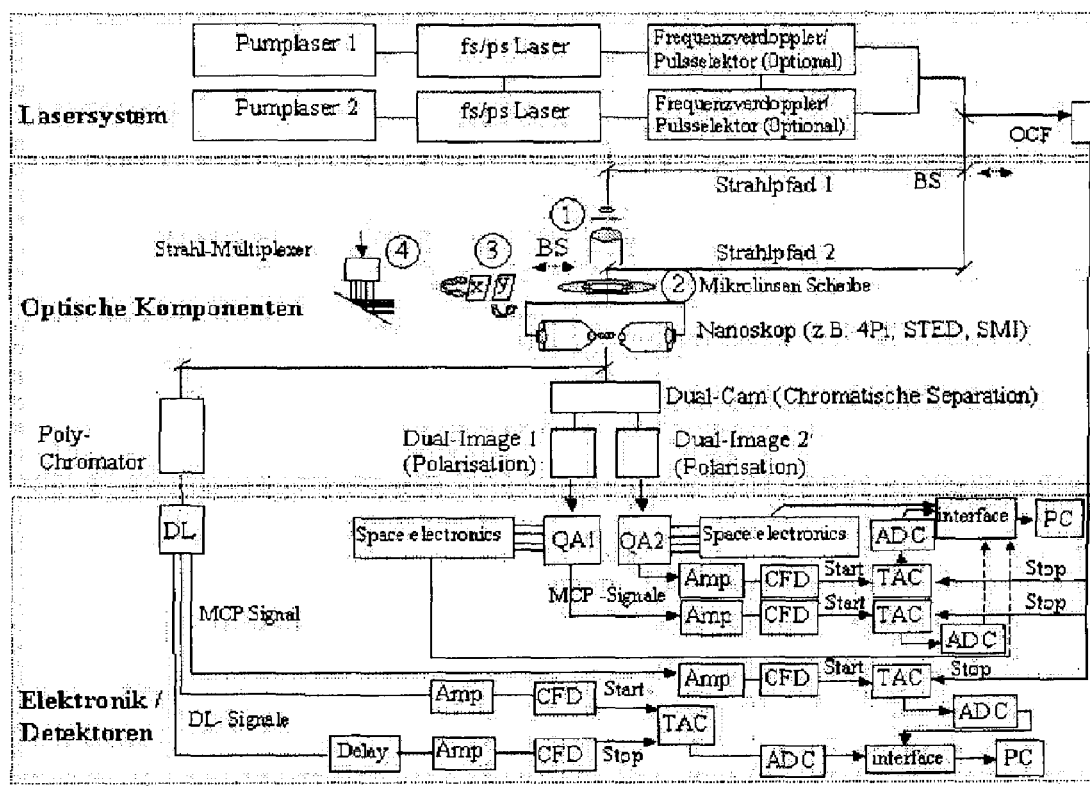
FIG. 4 shows a schematic of the design of a first exemplary embodiment of an inventive microscope.

FIG. 4 shows a schematic of an exemplary embodiment of an inventive microscope. In the case of the embodiment illustrated in FIG. 4a, coherent illuminating light of a radiation source 16 is focused linearly into an intermediate image plane ZB3 of the microscope through a suitable optics 11. In this case, the line runs in the x-direction. The optics 11 for implementing a linear light structure is designed as a cylindrical lens 17. The intermediate image ZB3 is imaged via a lens 18 into the pupil plane P2 conjugate with the pupil P1 of the microscope objective 13, where the light distribution runs linearly in the y-direction.

Arranged in the pupil plane P3 of the microscope is a beam splitter 19 with a strip-shape reflection layer RS. The beam splitter 19 is reflecting only in the region of the line RS, and so the measuring signal 8 that is to be detected backwards and illuminates the entire pupil plane P3 is transmitted virtually completely.

The pupil P3 is imaged through optics 20 and 18 onto a Y scanner 21 that can scan the beam for imaging in the y-direction. This is likewise located in the pupil plane P2. Via the scanning eyepiece 22, further imaging is performed into an intermediate image ZB1 where a light strip is again produced in the x-direction. This is imaged into the focal plane FE in the sample space via the tube lens 23 and the objective 13. There is produced in this case in the pupil P1 of the objective 13 a linear light distribution in the y-direction analogous to the pupil plane P3 in which the beam splitter 19 is located. A (diffraction limited) illumination strip analogous to the intermediate image plane ZB3 is produced in the focal plane FE.

A phase modulation is carried out along the pupil line 14 in order to produce the inventive focal line 10 with a central intensity zero point 5 and lateral intensity maxima 9. To this end, in the exemplary embodiment illustrated a phase jump is introduced in the pupil P3 in the exemplary embodiment illustrated by providing a portion of the beam splitter 19 with a phase retarded structure PV that retards the phase of the light by half a wave train. As shown in FIG. 4b—the coating PV, here of transparent design, in this case covers one half of the reflection layer RS running over the entire pupil diameter. Because of the refractive index of the layer, when traversing the coating PV the light is retarded as against the light that traverses uncoated sites (that is to say air). The coating PV can be produced, for example, from a dielectric such as magnesium fluoride or silicon dioxide, and vapor deposited onto the reflection layer RS. A structure based on a liquid crystal layer is also conceivable.

An alternative implementation would be the insertion of a phase retarding element in a further pupil plane that can be produced by further imaging lenses (not illustrated here). It would then be possible to arrange in this further pupil plane phase retarding elements such as substrates with dielectric coatings, phase modulators based on liquid crystals or achromatic phase filters. All that is decisive is the introduction of an optics with the described phase retarding property, this ideally being arranged in or near a pupil plane.

The detection light (generally fluorescence) is imaged as measuring signal 8 onto a confocally arranged row detector 26 through the objective 13, the tube lens 23, the scanning eyepiece 22, the scanner 21 (descanned detection), the lenses 18 and 20, a filter 24 for spectral filtering, and a detector lens 25. A non-descanned detection is also conceivable, and in this case the detector 26 would need to be arranged between the scanner 21 and objective 13.

Figure 5:
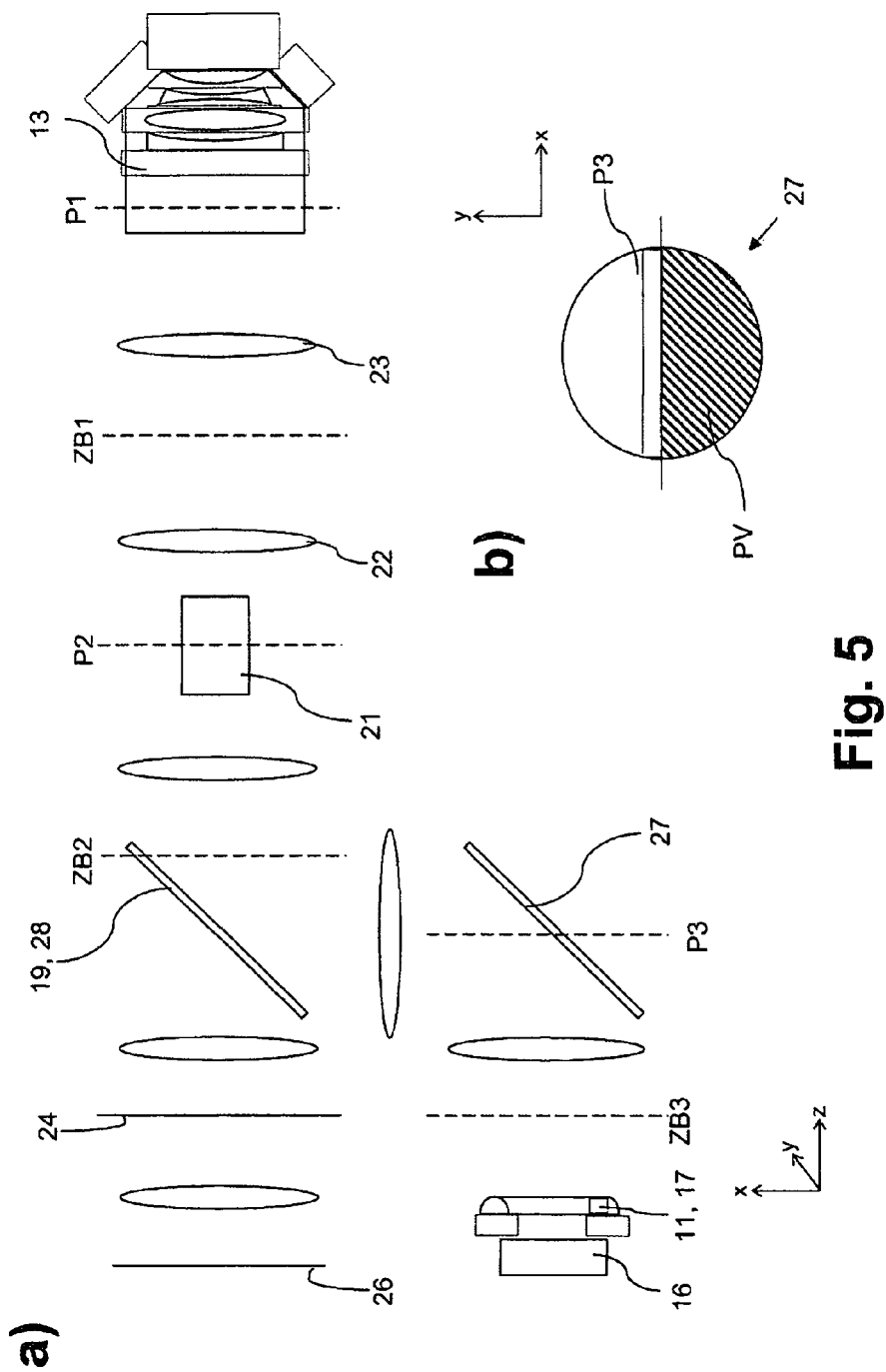
FIG. 5 shows a schematic of the design of a second exemplary embodiment of an inventive microscope.
Figure 1:
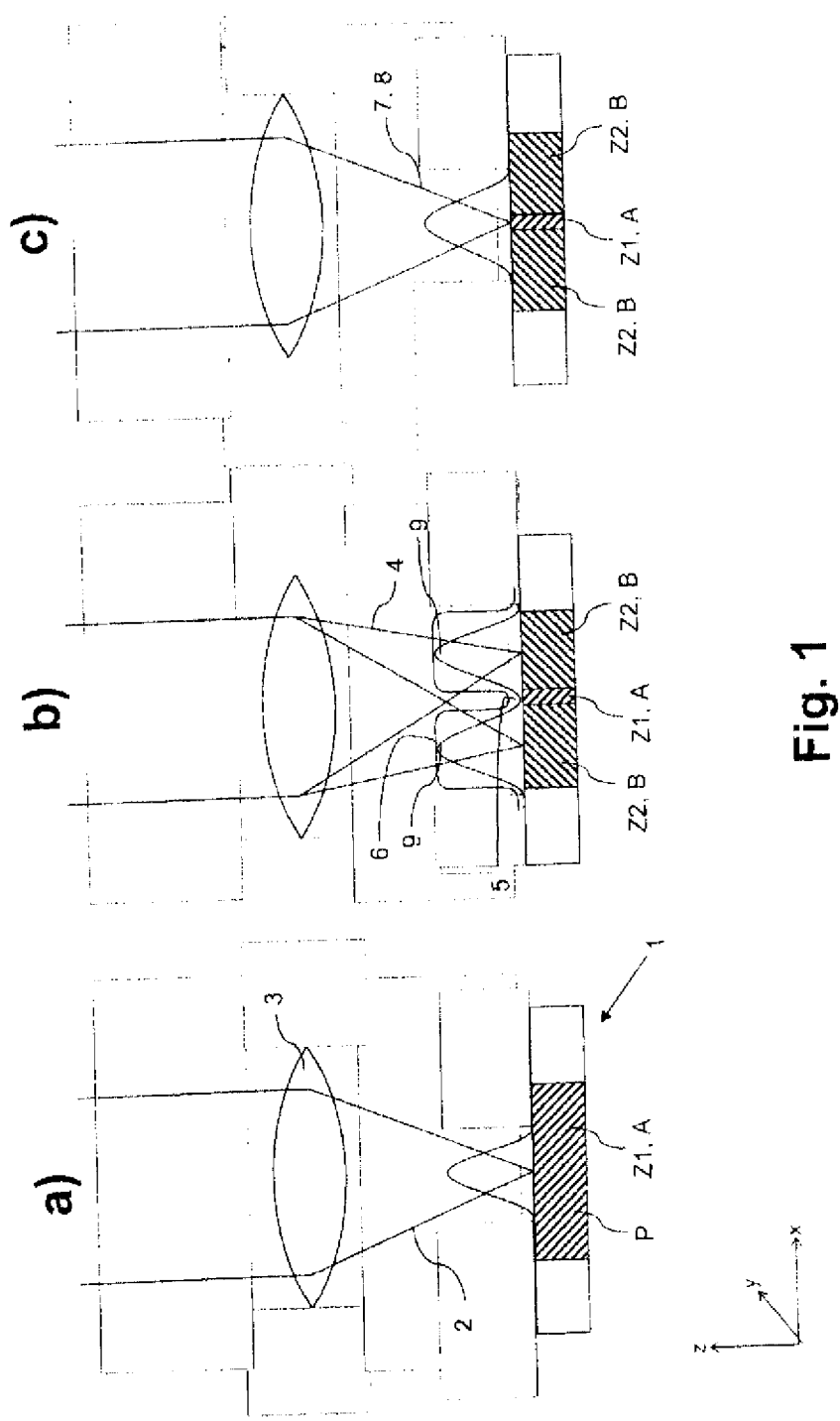
Figure 2:
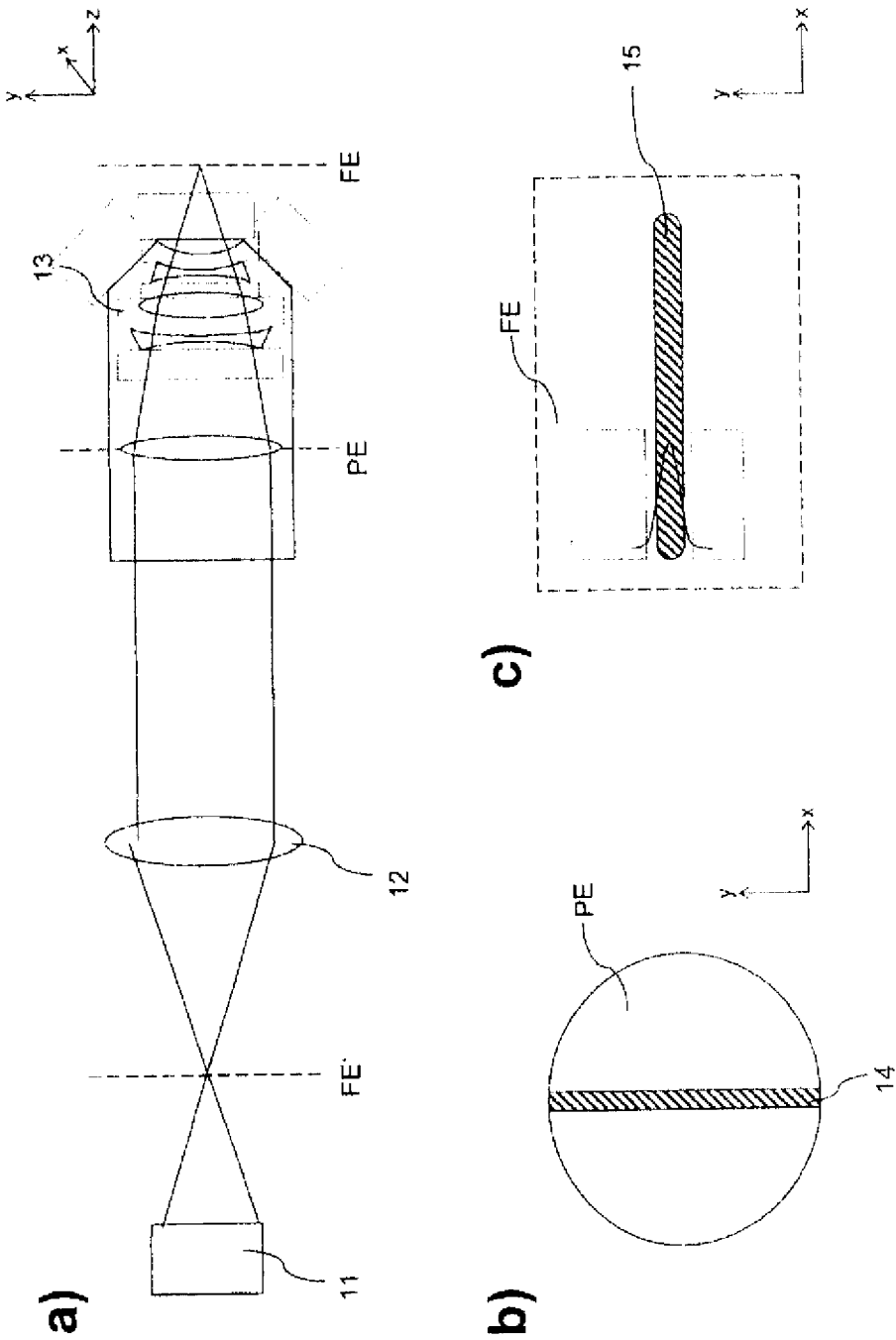
Figure 3:
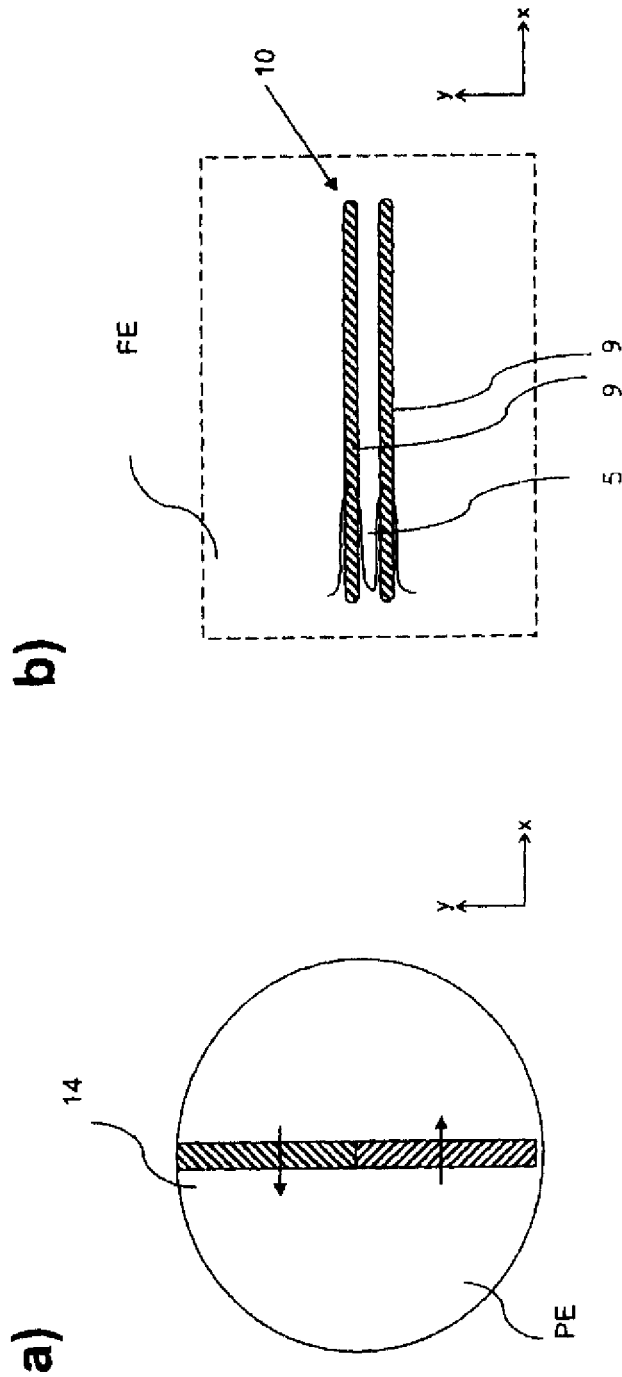
Figure 4:
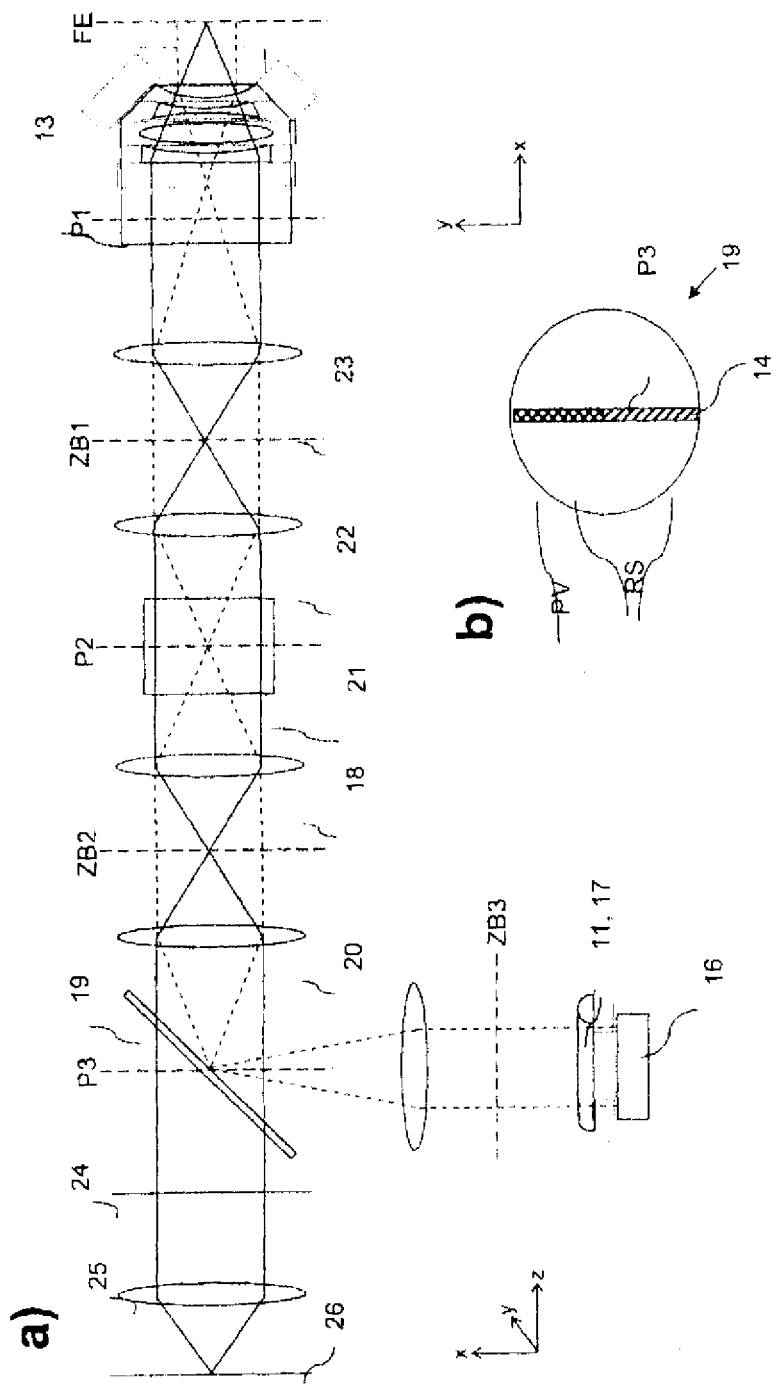

FIG. 5 is a schematic of a further embodiment of an inventive microscope, the design being conceptually similar to the design of the microscope in accordance with FIG. 4. The beam paths are not illustrated for reasons of clarity. In a departure from the design in accordance with FIG. 4, no beam splitter 19 that functions simultaneously as a (spatial) beam splitter and as a phase retarding element is arranged in the pupil plane P3, which is linearly illuminated (pupil line 14 in the y-direction). Rather, the two functions are separated in that the beam splitter 19 now functions exclusively as a spatial beam splitter, whereas the phase retardation is performed by an additionally inserted phase retarding optics 27. The phase retarding optics 27, that is likewise arranged in or near the pupil P3 can, in turn, be a substrate that is provided in a spatially structured fashion with a phase retarding, transparent coating PV (dielectric) The optics 27 is of circular design in FIG. 5b, the semicircle lying in the negative y-direction being provided with the phase retarding coating PV. Furthermore, phase modulators based on liquid crystals, or achromatic phase filters, arrays with movable micromirrors, or other deformable mirrors are also conceivable. A conventional dichroic beam splitter 28, for example in the form of an edge filter, comes into use as beam splitter 19 for separating illuminating light and detection light. The phase retarding optics 27 is arranged downstream of the dichroic beam splitter 28.

In order to avoid repetitions, reference may be made to the general part of the description and to the attached patent claims with regard to further advantageous refinements of the method according to the invention and of the microscope according to the invention.

Finally, it may be pointed out expressly that the above described exemplary embodiments serve merely for discussing the teaching claimed, but do not restrict the latter to the exemplary embodiments.

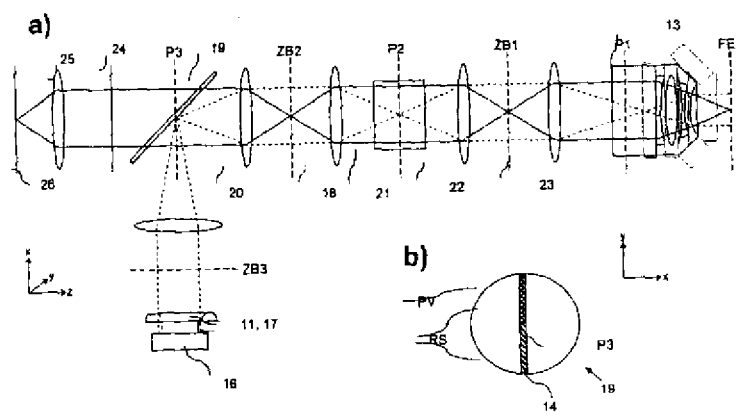

The invention claimed is:

1. A method for high spatial resolution examination of a sample, the sample to be examined comprising a substance that can be repeatedly converted from a first state into a second state, the first and the second states differing from one another in at least one optical property, comprising:
   firstly bringing a sample region of the substance to be recorded into the first state; and
   inducing the second state by an optical signal imaged by an objective, wherein spatially delimited subregions are specifically excluded within the sample region to be recorded,
   wherein the optical signal is provided in the form of a focal line with a cross-sectional profile having at least one intensity zero point with laterally neighboring intensity maxima,
   wherein the focal line is produced by a linear illumination in a pupil plane conjugate with the pupil of the objective and by suitable phase modulation along a pupil line of the pupil, and
   wherein the phase modulation is undertaken in such a way that one or more phase jumps are introduced along the pupil line.

2. The method as claimed in claim 1, wherein a phase jump is introduced at the pupil midpoint.

3. The method as claimed in claim 2, wherein the introduced phase jump corresponds to the length of half a wave train.

4. The method as claimed in claim 1, wherein a number of phase jumps, by in each case half a wave train, are introduced along the pupil line.

5. The method as claimed in claim 1, wherein the phase modulation along the pupil line is implemented by a spatial liquid-based phase modulator in an intermediate image of the pupil.

6. The method as claimed in claim 1, wherein the phase modulation along the pupil line is implemented by an optical component having a phase-retarding optical coating and arranged in an intermediate image of the pupil.

7. The method as claimed in claim 1, wherein the phase modulation along the pupil line is implemented by an optical component arranged in an intermediate image of the pupil, the component firstly generating a phase jump by total reflection, and subsequently generating a reflection at a metal layer.

8. The method as claimed in claim 1, wherein the phase modulation along the pupil line is implemented by an optical element arranged in an intermediate image of the pupil, the element having one or more deformable and/or movable mirrors and/or mirror elements.

9. The method as claimed in claim 1, wherein the pupil line is produced by focusing an illuminating light beam of an illuminating light source with a cylindrical lens or a Powell lens.

10. The method as claimed in claim 1, wherein the pupil line is produced by imaging a split diaphragm into the pupil plane.

11. The method as claimed in claim 1, wherein the pupil line is produced by holographic elements.

12. The method as claimed in claim 1, wherein the pupil line is coupled into the beam path by an Achrogate filter.

13. The method as claimed in claim 12, wherein the phase modulation along the pupil line is implemented by additional phase-retarding layers on the Achrogate filter.

14. The method as claimed in claim 1, wherein a laser is used as an illuminating light source for providing the optical signal.

15. The method as claimed in claim 1, wherein the light of the optical signal is polarized perpendicular to the pupil line.

16. The method as claimed in claim 1, wherein the focal line is produced sequentially in different spatial directions.

17. The method as claimed in claim 16, wherein the sample region to be recorded is multiply scanned in each case in accordance with the respective spatial direction of the focal line.

18. The method as claimed in claim 17, wherein individual images are assembled mathematically to form an overall image.

19. The method as claimed in claim 1, wherein the transition from the first state into the second state is implemented by multiphoton absorption.

20. The method as claimed in claim 1, wherein a measuring signal emanating from the sample is read out by multiphoton excitation.

21. The method as claimed in claim 1, wherein the optical signal and a test signal are generated in order to read out the first state by means of pulsed light sources.

22. The method as claimed in claim 21, wherein the pulsed light sources are synchronized.

23. A laser scanning fluorescence microscope for carrying out a method of high spatial resolution examination of a sample, the sample to be examined comprising a substance that can be repeatedly converted from a first state into a second state, the first and the second states differing from one another in at least one optical property, comprising:

a microscope objective for imaging an optical signal onto a focal plane in the sample, and for receiving a measuring signal emanating from the sample;

an optical component for producing a pupil line in a pupil plane conjugate with a pupil of the microscope objective; and a phase modulating element for producing a cross-sectional profile of a focal line by phase modulation of the pupil line, wherein the optical signal is provided in the form of the focal line with a cross-sectional profile having at least one intensity zero point with laterally neighboring intensity maxima, wherein the phase modulating element is designed as a spatial liquid-based phase modulator arranged in an intermediate image of the pupil, or as an optical component having a phase retarding dielectric coating arranged in the intermediate image of the pupil.

24. The microscope as claimed in claim 23, wherein the optical component for producing the pupil line, and the phase modulating element are designed as a structural unit.

25. The microscope as claimed in claim 24, wherein the optical component for producing the pupil line, and the phase modulating element are respectively arranged as separate units in the illuminating beam path.

26. The microscope as claimed in claim 23, wherein the optical component for producing the pupil line is designed as a cylindrical lens and/or as a Powell lens and/or as a holographic element.

27. The microscope as claimed in claim 23, wherein an illuminating light source for generating the optical signal is designed as a laser.

28. The microscope as claimed in claim 23, wherein an illuminating light source for generating the optical signal is combined with at least one further light source in order to read out the measuring signal emanating from the sample, or to induce the first state.

29. The microscope as claimed in claim 28, wherein the further light source illuminates the sample entirely or partially linearly.

30. The microscope as claimed in claim 23, wherein the focal line of the optical signal is spatially superposed by a further line.

31. The microscope as claimed in claim 30, wherein the intensity zero point of the focal line of the optical signal is spatially superposed by the maximum of a line.

32. The microscope as claimed in claim 31, wherein each line is assigned a scanning device in the form of a scanning mirror.

33. The microscope as claimed in claim 32, wherein the scanning direction corresponds to a running direction of the pupil line.

34. The microscope as claimed in claim 23, further comprising a row detector for line detection of the measuring signal emanating from the sample.

35. The microscope as claimed in claim 34, wherein the row detector is designed as a CCD row, as an EMCCD or as an APD.

36. The microscope as claimed in claim 35, wherein the row detector is arranged confocally with the focal line.

37. The microscope as claimed in claim 36, further comprising scanning device(s), wherein the row detector is arranged in a detection direction downstream of the scanning device(s) or upstream of the scanning device(s).

* * * * *

UNITED STATES PATENT AND TRADEMARK OFFICE
CERTIFICATE OF CORRECTION

| | | |
|---|---|---|
| PATENT NO. | : 7,679,741 B2 | Page 1 of 6 |
| APPLICATION NO. | : 11/653446 | |
| DATED | : March 16, 2010 | |
| INVENTOR(S) | : Marcus Dyba et al. | |

It is certified that error appears in the above-identified patent and that said Letters Patent is hereby corrected as shown below:

On the Title Page

Please delete the incorrect drawing on the Title page and replace with the correct figure (figure 4) attached herewith.

In The Drawings

Please delete the incorrect drawings, Figures 1-4 in the published patent and replace with the correct drawing Figures 1-4. A copy is attached herewith.

Signed and Sealed this

Twenty-eighth Day of December, 2010

David J. Kappos
*Director of the United States Patent and Trademark Office*

(12) United States Patent
Dyba et al.

(10) Patent No.: US 7,679,741 B2
(45) Date of Patent: Mar. 16, 2010

(54) METHOD AND MICROSCOPE FOR HIGH SPATIAL RESOLUTION EXAMINATION OF SAMPLES

(75) Inventors: Marcus Dyba, Mannheim (DE); Hilmar Gugel, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 405 days.

(21) Appl. No.: 11/653,446

(22) Filed: Jan. 16, 2007

(65) Prior Publication Data
US 2007/0206278 A1    Sep. 6, 2007

Related U.S. Application Data

(60) Provisional application No. 60/853,447, filed on Oct. 23, 2006.

(30) Foreign Application Priority Data
Mar. 1, 2006    (DE) ............... 10 2006 009 831

(51) Int. Cl.
*G01J 3/30*    (2006.01)
(52) U.S. Cl. .................................... 356/318
(58) Field of Classification Search ............. 356/318
See application file for complete search history.

(56) References Cited

U.S. PATENT DOCUMENTS

| | | | |
|---|---|---|---|
| 4,621,911 A * | 11/1986 | Lanni et al. | 359/386 |
| 6,055,097 A * | 4/2000 | Lanni et al. | 359/386 |
| 6,255,642 B1 * | 7/2001 | Cragg et al. | 250/216 |
| 7,064,824 B2 * | 6/2006 | Hell | 356/317 |
| 7,485,875 B2 * | 2/2009 | Wolleschensky et al. | 250/458.1 |
| 2001/0045523 A1 * | 11/2001 | Baer | 250/459.1 |
| 2004/0114138 A1 | 6/2004 | Hell | |

(Continued)

FOREIGN PATENT DOCUMENTS

DE    101 18 355 B4    10/2002

(Continued)

OTHER PUBLICATIONS

U.S. Appl. No. 11/653,444, filed Jan. 16, 2007, Gugel et al.

(Continued)

*Primary Examiner*—Kara E Geisel
(74) *Attorney, Agent, or Firm*—Foley & Lardner LLP

(57) ABSTRACT

A method and a microscope, in particular a laser scanning fluorescence microscope, for high spatial resolution examination of samples, the sample (1) to be examined comprising a substance that can be repeatedly converted from a first state (Z1, A) into a second state (Z2, A), the first and the second states (Z1, A; Z2, B) differing from one another in at least one optical property, comprising the steps that the substance in a sample region (P) to be recorded is firstly brought into the first state (Z1, A), and that the second state (Z2, B) is induced by means of an optical signal (4), spatially delimited subregions being specifically excluded within the sample region (P) to be recorded, are defined in that the optical signal (4) is provided in the form of a focal line (10) with a cross-sectional profile having at least one intensity zero point (5) with laterally neighboring intensity maxima (9).

37 Claims, 5 Drawing Sheets